United States Patent
Pastor

(10) Patent No.: US 12,436,308 B2
(45) Date of Patent: Oct. 7, 2025

(54) MOVING VELOCITY PROFILER FOR VESSEL-BASED UNDERWATER SENSING

(71) Applicant: FNV IP B.V., Leidschendam (NL)

(72) Inventor: Chad Pastor, Lafayette, LA (US)

(73) Assignee: FNV IP B.V., Leidschendam (NL)

( * ) Notice: Subject to any disclaimer, the term of this patent is extended or adjusted under 35 U.S.C. 154(b) by 268 days.

(21) Appl. No.: 18/086,604

(22) Filed: Dec. 21, 2022

(65) Prior Publication Data

US 2024/0210588 A1 Jun. 27, 2024

(51) Int. Cl.
*G01V 1/38* (2006.01)
*B63B 21/66* (2006.01)

(52) U.S. Cl.
CPC .......... *G01V 1/3843* (2013.01); *B63B 21/66* (2013.01); *B63B 2211/02* (2013.01)

(58) Field of Classification Search
None
See application file for complete search history.

(56) References Cited

U.S. PATENT DOCUMENTS

| | | | | |
|---|---|---|---|---|
| 2,981,220 A | * | 4/1961 | Fehlner | B63B 21/66 367/17 |
| 4,254,480 A | * | 3/1981 | French | G01V 1/20 367/57 |
| 4,317,185 A | * | 2/1982 | Thigpen | G01V 1/201 114/247 |
| 6,088,297 A | * | 7/2000 | Stottlemyer | G01S 15/88 367/902 |
| 9,244,184 B2 | * | 1/2016 | Voldsbekk | G01V 1/38 |
| 10,054,104 B1 | * | 8/2018 | Cote | G05D 1/10 |
| 10,248,886 B2 | * | 4/2019 | Ursin | G06T 7/50 |
| 10,611,437 B2 | * | 4/2020 | Toole | G01C 13/004 |
| 10,683,075 B2 | * | 6/2020 | Schibli | B63B 34/20 |
| 2002/0045989 A1 | * | 4/2002 | Martin | G01V 1/201 702/14 |
| 2006/0176775 A1 | * | 8/2006 | Toennessen | G01V 1/3826 367/16 |
| 2009/0211509 A1 | * | 8/2009 | Olivier | G01V 1/3826 114/244 |

(Continued)

FOREIGN PATENT DOCUMENTS

CN  212254090 U  * 12/2020

*Primary Examiner* — Hovhannes Baghdasaryan
*Assistant Examiner* — Vikas Atmakuri
(74) *Attorney, Agent, or Firm* — Polsinelli PC

(57) ABSTRACT

Disclosed herein is a towed sensing apparatus for underwater profiling. The apparatus includes a sensor array including one or more sound velocity sensors for determining vertical water column profile information. A sensor housing portion can include a receptacle for receiving the sensor array, the receptacle including one or more apertures for providing water flow to the sensor array during subsurface deployment of the apparatus. A coupling mechanism can be provided to removably couple the sensor array within the receptacle by coupling the sensor array to an inner surface of the receptacle. The weighted nose portion can be coupled to the sensor housing portion and can have a greater mass than a second end of the towed sensing apparatus opposite from the first end. One or more hydrodynamic surfaces can extend radially from the towed sensing apparatus and can be arranged to exert a respective force when the apparatus is deployed.

20 Claims, 6 Drawing Sheets

(56) References Cited

U.S. PATENT DOCUMENTS

| | | | |
|---|---|---|---|
| 2009/0245019 A1* | 10/2009 | Falkenberg | G01V 1/3835 |
| | | | 367/19 |
| 2014/0204705 A1* | 7/2014 | Tonchia | B63B 21/66 |
| | | | 367/17 |
| 2015/0053127 A1* | 2/2015 | Bertalan | B63B 34/00 |
| | | | 114/125 |
| 2016/0195628 A1* | 7/2016 | Poole | G01V 1/3808 |
| | | | 367/16 |
| 2017/0010372 A1* | 1/2017 | Lambert | G01V 1/202 |
| 2017/0235004 A1* | 8/2017 | Boberg | G01V 3/165 |
| | | | 367/17 |
| 2018/0317004 A1* | 11/2018 | Sheedy | B63H 21/21 |
| 2020/0264326 A1* | 8/2020 | Irving | G01V 1/137 |
| 2020/0319226 A1* | 10/2020 | Toole | B63G 8/26 |

\* cited by examiner

MOVING VELOCITY PROFILER FOR VESSEL-BASED UNDERWATER SENSING

FIELD

The present disclosure relates to underwater sensing and acquisition system and methods of use thereof. Specifically, the system includes a modular drop weight that is removably coupled to one or more sensors for performing underwater profiling.

BACKGROUND

Site characterization and asset integrity marine surveying use acoustic equipment to acquire remote sensing data of the seafloor and/or water column. For example, an acoustic side-scan sonar fish can be towed through a body of water and used to create an aerial image of the seafloor. In other examples multibeam sensing can be used for measuring water depths to produce a bathymetric map, a sub-bottom profiler can be used for penetrating into the seafloor, and/or Ultra High-Resolution seismic sensing can be used for penetrating deep into the seafloor. The collected sensor data can be used to identify and classify various type of geohazards, and to measure water column information for environmental purposes, among various other uses.

To derive highly accurate geospatial images and/or to map geohazard locations, there is a need to convert raw acoustic remote sensing data from time-based information to distance-based information in an accurate manner. Part of this process involves applying frequent vertical water velocity profiles of the water column during real time or post processing (e.g., the water column in which the remote sensors are deployed during collection of the raw acoustic sensing data). However, conventional profiling systems are complex, expensive, and can be prone to entanglement (e.g., entanglement with other towed sensors, entanglement with fishing gear).

SUMMARY

Aspects of the present disclosure include a towed sensing apparatus for underwater profiling. For example, a towed sensing apparatus for underwater profiling can comprise: a sensor array, the sensor array including one or more sound velocity sensors for determining vertical water column profile information; a sensor housing portion including a receptacle for receiving the sensor array, wherein the receptacle includes one or more apertures for providing water flow to the sensor array during a subsurface deployment of the towed sensing apparatus; a coupling mechanism for removably coupling the sensor array within the receptacle, wherein the coupling mechanism couples the sensor array to an inner surface of the receptacle; a weighted nose portion coupled to the sensor housing portion, wherein a first end of the towed sensing apparatus that includes at least the weighted nose portion has a greater mass than a second end of the towed sensing apparatus opposite from the first end; and one or more of hydrodynamic surfaces extending radially from the towed sensing apparatus, each hydrodynamic surface of the one or more hydrodynamic surfaces arranged to exert a respective force during subsurface deployment of the towed sensing apparatus.

In some aspects, a method of underwater profiling using a towed sensing apparatus is provided, the method comprising: deploying a towed sensing apparatus in a body of water, wherein the towed sensing apparatus is communicatively coupled to a surface vessel by a tether; towing the towed sensing apparatus through the body of water using the surface vessel, wherein one or more hydrodynamic surfaces extending from the towed sensing apparatus convert a horizontal tow force exerted on the towed sensing apparatus by the surface vessel into a vertical downward driving force exerted on the towed sensing apparatus; automatically unspooling the tether, based on a currently determined dive depth of the towed sensing apparatus, to increase a deployed length of the tether coupling the towed sensing apparatus to the surface vessel; obtaining a plurality of sound velocity measurements using a sound velocity sensor included in a sensor array of the towed sensing apparatus, each sound velocity measurement of the plurality of sound velocity measurements associated with a different dive depth of the towed sensing apparatus and obtained during the automatically unspooling the tether; and automatically stopping unspooling the tether based on comparing the currently determined dive depth of the towed sensing apparatus to a pre-determined threshold, wherein automatically stopping unspooling the tether is associated with a maximum deployed length of the tether that is configured to prevent contact between the towed sensing apparatus and a seafloor.

In some aspects, the coupling mechanism comprises a saddle clamp, and wherein the sensor array is rigidly coupled within the receptacle of the sensor housing portion based on an outer surface of the sensor array being clamped between an inner surface of the saddle clamp and the inner surface of the receptacle.

In some aspects, the receptacle comprises an empty cylindrical volume for receiving the sensor array, wherein an inner diameter of the empty cylindrical volume of the receptacle is greater than or equal to an outer diameter of the sensor array.

In some aspects, the coupling mechanism couples the sensor array within the empty cylindrical volume of the receptacle such that at least a first distal end of the sensor array does not contact the sensor housing portion.

In some aspects, the receptacle includes a plurality of apertures for providing water flow to the sensor array, and wherein each respective aperture of the plurality of apertures is defined between adjacent pairs of longitudinal support members included in a plurality of longitudinal support members coupled to the weighted nose portion and disposed circumferentially about the sensor array.

In some aspects, the one or more hydrodynamic surfaces include one or more stabilizing fins, each stabilizing fin extending radially away from at least one of the sensor housing portion and the weighted nose portion and arranged to exert a damping force based on a radial velocity of the towed sensing apparatus.

In some aspects, each stabilizing fin is arranged to exert the damping force to oppose rotation of the towed sensing apparatus around a central longitudinal axis extending between the weighted nose portion and the sensor array.

In some aspects, the one or more hydrodynamic surfaces include a depressor wing coupled to the weighted nose portion, wherein the depressor wing is arranged to exert a downward driving force on the towed sensing apparatus.

In some aspects, during subsurface deployment of the towed sensing apparatus, the downward driving force exerted by the depressor wing comprises: a horizontal force that drives the towed sensing apparatus horizontally toward a surface vessel tethered to the towed sensing apparatus; and a vertical force that drives the towed sensing apparatus vertically away from the surface vessel tethered to the towed sensing apparatus.

In some aspects, the sensor array further includes a depth sensor for determining a dive depth of the towed sensing apparatus during subsurface deployment of the towed sensing apparatus.

In some aspects, the depth sensor comprises a pressure sensor configured to generate water pressure information indicative of the dive depth of the towed sensing apparatus; and the water pressure information corresponds to a detected pressure of the water flow provided to the sensor array through the one or more apertures included in the receptacle of the sensor housing portion.

In some aspects, the subsurface deployment of the towed sensing apparatus is controlled based on the water pressure information such that each deployment cycle of a plurality of deployment cycles of the towed sensing apparatus is stopped based on the water pressure information being greater than a pre-determined threshold.

In some aspects, the pre-determined threshold comprises a pressure value associated with a pre-determined seafloor separation distance.

In some aspects, the towed sensing apparatus further includes a coupler affixed to an outer surface of the weighted nose portion, wherein the coupler includes one or more attachment points for coupling the towed sensing apparatus to a tow cable.

In some aspects, the coupler is rigidly affixed to the outer surface of the weighted nose portion, and wherein the coupler includes a plurality of attachment points, each attachment point of the plurality of attachment points associated with a different center of gravity.

In some aspects, the towed sensing apparatus further includes a serial communication interface communicatively coupled between the sensor array and a corresponding surface receiver; and one or more power distribution interfaces electrically coupled between the sensor array and a surface power source.

In some aspects, the sensor array comprises: a cylindrical shell enclosing an interior volume; and a plurality of sensors disposed within the interior volume of the cylindrical shell; wherein a longitudinal axis of the cylindrical shell is parallel to a longitudinal axis of the sensor housing portion and the weighted nose portion.

In some aspects, the weighted nose portion comprises a cylindrical body having a cross-sectional diameter greater than a cross-sectional diameter of the sensor array and greater than a cross-sectional diameter of the sensor housing portion.

In some aspects, the sensor housing portion comprises a tapered protrusion extending longitudinally away from the weighted nose portion; and the tapered protrusion tapers from a maximum taper diameter at the weighted nose portion to a minimum taper diameter at the coupling mechanism.

Other advantages of the invention will become apparent from the following description taken in connection with the accompanying drawings, wherein is set forth by way of illustration and example an embodiment of the present invention.

BRIEF DESCRIPTION OF THE DRAWINGS

In order to describe the manner in which the advantages and features of the present inventive concept can be obtained, reference is made to embodiments thereof which are illustrated in the appended drawings. Understanding that these drawings depict only exemplary embodiments of the present inventive concept and are not, therefore, to be considered to be limiting of its scope, the principles herein are described and explained with additional specificity and detail through the use of the accompanying drawings in which.

DETAILED DESCRIPTION

Figure 1:
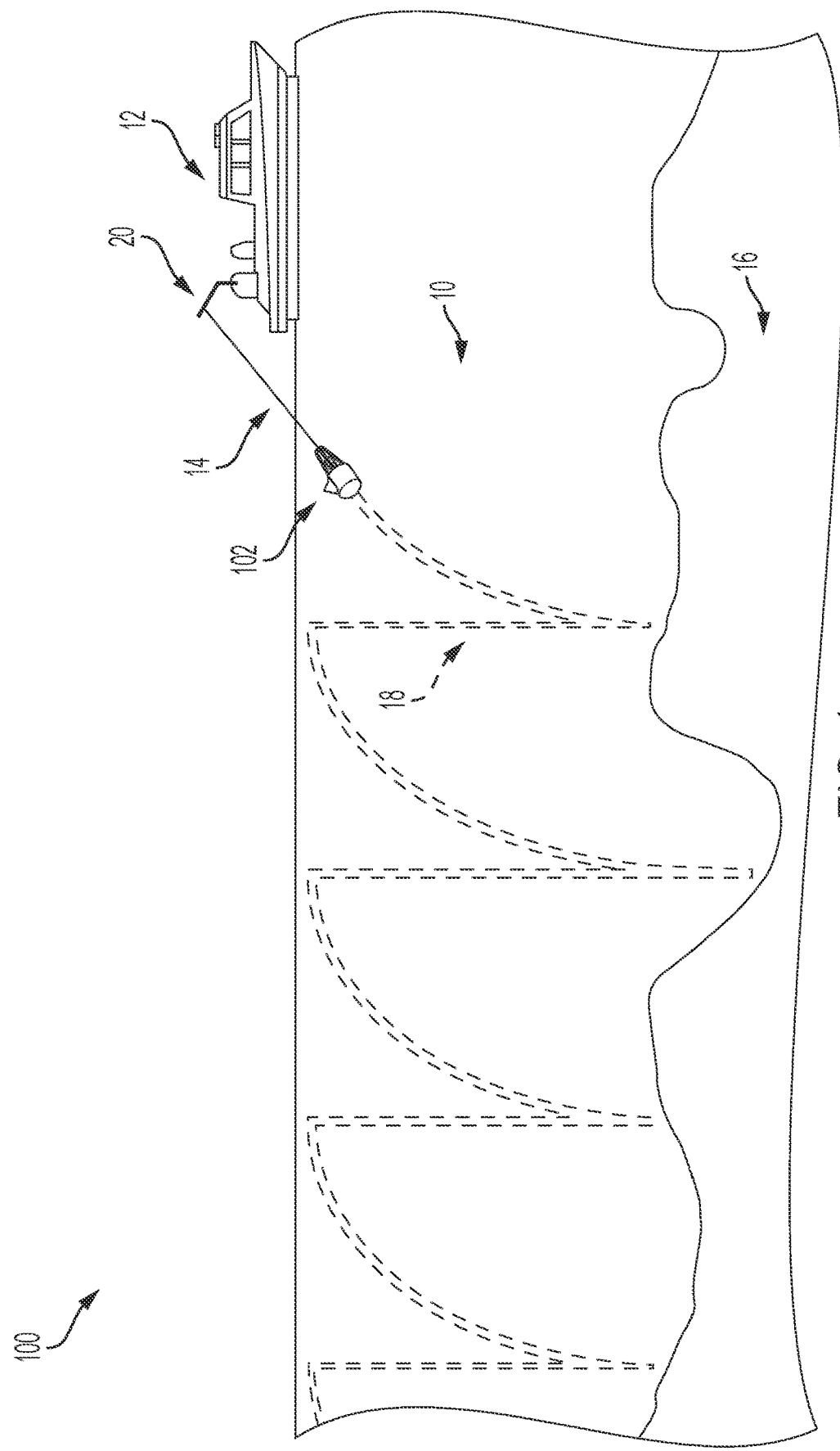
FIG. 1 illustrates a perspective view of an imaging system, including a towed sensing apparatus tethered to a surface vessel, according to an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Provided herein is a towed sensing apparatus for underwater profiling. For example, the towed sensing apparatus can be provided as a moving velocity profiler (MVP) for performing underwater profiling (e.g., in a body of water). The moving velocity profiler includes a drop weight and one or more sensors (e.g., any type of environmental water sensor). In one illustrative example, the sensors may be provided as a sensor array. The one or more sensors and/or the sensor array can include a sound velocity sensor and/or a pressure sensor, among various other types of environmental sensors. In some embodiments, the sensor array can include a single sound velocity sensor. In some embodiments, the sensors array can include at least one sound velocity sensor and one or more additional sensors. For instance, the one or more additional sensors can include one or more pressure sensors, one or more additional sound velocity sensors, etc. In some aspects, the sensor array can include one or more of a conductivity sensor, a temperature sensor, a depth sensor (e.g., such as a conductivity, temperature, depth (CTD) sensor), a dissolved oxygen sensor, a turbidity sensor, a chlorophyll fluorescence sensor, a physical water sample sensor, etc. In some aspects, the sensor array can include various sensors that may be used with and/or used to perform an acoustic sonar survey, a chemical or environmental study, etc. The drop weight includes a receptacle, which receives the sensor, and a clamp, which mounts (e.g., removably couples) the sensor to the drop weight. The receptacle receives the sensor and includes openings that provide constant water flow to the sensor when the moving velocity profiler is deployed. The drop weight and sensor are modular (e.g., interchangeable) as a result of the clamp that mounts the sensor to the drop weight.

To deploy the moving velocity profiler to perform underwater profiling (e.g., collecting a vertical water column profile using a sound velocity sensor), the moving velocity profiler is connected to a tow cable that extends from a boat or other vessel. The vessel may be a manned or unmanned surface vessel (USV), a sub-surface vessel, such as a submarine vessel, either manned, or unmanned. In an embodiment, the vessel may be a submersed, semi-buoyant, or buoyant vessel. In an embodiment, the vessel may be any appropriate tow-vehicle.

Then, the moving velocity profiler is lowered into a body of water. When deployed, the sensor (e.g., sound velocity sensor) collects vertical water column profile information. The mass of the drop weight (e.g., weighted head) and/or one or more hydrodynamic surfaces extending radially from the moving velocity profiler drives the profiler in a substantially vertical (e.g., downward) direction. This substantially vertical movement can reduce the amount of tow cable deployed (e.g., can keep the moving velocity profiler positioned closer to the surface tow vessel from which the profiler is deployed or otherwise tethered to), which can increase cycle times of the profiler over conventional systems and also mitigate entanglement (e.g., entanglement with other towed sensors, entanglement with fishing gear).

The moving velocity profiler described herein may provide significant benefits over conventional equipment. For example, the presently disclosed moving velocity profiler may improve the ability to collect vertical water column profiles with higher cycle times in a safe and accurate manner relative to conventional equipment.

As one example of benefits over conventional systems, the moving velocity profiler may improve the quality of data collected (e.g., such as acoustic sensor data indicative of sound velocity in a vertical column of water). For example, the moving velocity profiler disclosed herein can provide stability when the profiler is being lowered at high speeds (e.g., via one or more of a weighted head and/or hydrodynamic surface(s) included in the moving velocity profiler). Moreover, the moving velocity profiler can provide continuous laminar water flow over the sensor, for example via one or more openings provided in a sensor housing portion of the moving velocity profiler and/or via weighted head of the moving velocity profiler. The consistent fluid flow (e.g., water flow) through the open portion can optimize the accuracy of the sensor (e.g., a sound velocity sensor), whereas a more enclosed design would cause a slower exchange of water through the sensor.

For instance, a slower exchange of water through or around the sound velocity sensor of the moving velocity profiler and/or a more turbulent flow of water through or around the sound velocity sensor may decrease the accuracy of the collected data as the sensor is moving quickly through different thermoclines. In other words, the design geometry of the presently disclosed moving velocity profiler reduces pressure changes at the location of the one or more sensors (e.g., sound velocity sensors) relative to the surrounding water, thereby increasing the accuracy of the sound velocity sensor data and resulting vertical water velocity profiles of the water column in which the moving velocity profiler is deployed. High and/or low-pressure zones around the sensor, which can be induced by design geometry, decreases the accuracy of the data. Based on the design geometry of the presently disclosed moving velocity profiler, there is a very small change in pressure at the location of the sensor as compared to the surrounding water.

As another example, the moving velocity profiler may increase a quantity of deployment cycles that can be performed using the moving velocity profiler in a given amount of time. For instance, the presently disclosed moving velocity profiler may be deployed with a decreased cycle time for each discrete cycle (e.g., a complete cycle of deploying the moving velocity profiler to obtain vertical water column data can be completed in a shorter, decreased elapsed time as compared to conventional approaches for obtaining vertical water column data). For example, the presently disclosed moving velocity profiler may reduce hydrodynamic drag and support faster vertical travel rates over a conventional sensor of the same mass (e.g., weight). In some examples, the moving velocity profiler may produce a cycle time that is approximately twenty-three percent faster than industry standards. For example, the moving velocity profiler may produce a cycle time of approximately 1.7 minutes versus a conventional system time of approximately 2.2 minutes to reach approximately thirty meters.

As another example of benefits over conventional systems, the moving velocity profiler may mitigate entanglement (e.g., entanglement with other towed sensors, entanglement with fishing gear). For example, the moving velocity profiler may maximize its cast depth to minimize the mount of tow cable deployed (e.g., shorter cable out distance vs water depth ratio). This can provide for lower cycle times, as discussed above, and may also reduce the chance of entanglement. In some aspects, the moving velocity profiler may have a superior dive performance over conventional equipment. Additionally, the moving velocity profiler may be more hydrodynamic than conventional equipment. In some examples, the moving velocity profiler may have an integrated dive plane to drive the unit downward as opposed to gravity alone. Moreover, a heavy, double armored steel tow cable may be used to increase the combined mass (e.g., weight) of the moving velocity profiler and tow cable. This combination can keep the moving velocity profiler close to the vessel (e.g., during the cable haul in process), which can minimize the length tow cable deployment. Minimizing tow cable mitigates entanglement with other towed sensors and/or fishing gear, thereby mitigating tow cable breakage. In addition, the moving velocity profiler can include one or more center of gravity adjustable tow points for optimizing towing characteristics (e.g., as will be described in greater detail below, with respect to FIGS. 3A and 3B). For instance, the presently disclosed moving velocity profiler can include one or more different tow points (e.g., provided as apertures on a coupler or other tow mechanism affixed to a weighted nose portion of the presently disclosed apparatus). The different tow points can be used to optimize towing characteristics of the moving velocity profiler in the vertical plane. For instance, a particular tow point of the different tow points can be selected to optimize the towing characteristics of the moving velocity profiler in the vertical plane extending in the deployment or dive direction of the moving velocity profiler (e.g., extending from the water surface to the seafloor). In one illustrative example, a particular tow point of the different center of gravity adjustable tow points can be selected to optimize the towing characteristics of the moving velocity profiler such that the moving velocity profiler "flies flat" through the body of water in which it is deployed (e.g., thereby providing optimal drag performance along the vertical plane extending from the water surface to the seafloor).

As another example, the moving velocity profiler may have increased reliability over conventional equipment. For example, the moving velocity profiler (e.g., the drop weight) does not have any moving parts and, as a result, has no predicted life limitation.

As another example of benefits over conventional systems, the moving velocity profiler may automate the recording of velocity cast profiles. For example, automated winch and an on-board depth sensor can control the depth of travel of the moving velocity profiler. The towed sensing apparatus can provide a real time data feed (e.g., information collected by the sensor).

As another example, the moving velocity profiler is modular (e.g., interchangeable drop weight, interchangeable sensor). For instance, a given sensor can be interchangeably coupled to various drop weights (e.g., via the clamp). Similarly, a given drop weight can be interchangeably coupled to various sensors. For example, when a sensor fails, the inoperative sensor can be removed from the drop weight and replaced with an operative sensor. As another example, an operative sensor can be removed from a first drop weight and mounted to a second drop weight. In some examples, the sensor can be changed in less than five minutes, which may optimize (e.g., reduce) downtime of a moving velocity profiler in the event of a sensor failure.

As another example of benefits over conventional systems, the moving velocity profiler may be more cost effective (e.g., cost less) than conventional equipment. As one example of cost-effectiveness, the moving velocity profiler may mitigate entanglement, as previously discussed. Entanglement could sever the moving velocity profiler, which could lead to a loss in the cost of the moving velocity profiler and/or recovery costs (e.g., lost equipment is considered debris by the government and in some cases must be recovered). In some aspects, the moving velocity profiler can be used in shallow water applications (e.g., offshore wind farm) in which fishing may be prominent (e.g., the surveying vessels is competing for the same geographic space as commercial fishermen). As another example of cost-effectiveness, the presently disclosed moving velocity profiler can be integrated with typical power supplies and topside communication hardware, which allows the moving velocity profiler to interface with other equipment and reduces the cost of operating the moving velocity profiler. In some examples, the moving velocity profiler may cost approximately five times less than conventional equipment, which can be especially beneficial when the moving velocity profiler is used in high fishing areas.

As another example of benefits over conventional systems, the moving velocity profiler may be scalable. For example, the moving velocity profiler can be used for shallower water operations (e.g., offshore wind farm). However, it is also contemplated that the moving velocity profiler can be scaled-up for use in deeper water applications without departing from the scope of the present disclosure.

FIG. 1 illustrates a perspective view of an imaging system 100 for performing underwater profiling, such as collecting vertical water column profiles 18, in a body of water 10 (e.g., an ocean or sea, lake, etc.). The system 100 includes a surface vessel 12 (e.g., boat, towing vessel, towing vehicle, unmanned surface vessel), a tow cable 14 (e.g., tether), and a towed sensing apparatus 102. To deploy the towed sensing apparatus 102 to perform underwater profiling (e.g., collecting vertical water column profiles 18), one end of the tow cable 14 is connected (e.g., removably coupled) to the vessel 12 and the opposite end of the tow cable 14 is connected (e.g., removably coupled) to the towed sensing apparatus 102. Subsequently, the towed sensing apparatus 102 can be lowered into the body of water 10.

When the towed sensing apparatus 102 is deployed (e.g., collecting a vertical water column profile 18), the configuration (e.g., mass, hydrodynamic surface(s)) of the towed sensing apparatus 102 causes it to travel substantially vertically through a water column (e.g., advance substantially downward towards the seafloor 16). During descent, the towed sensing apparatus 102 can be stopped at a predetermined depth, before contacting the seafloor 16. Then, a winch 20 (e.g., a winch 20 coupled to the vessel 12 and the two cable 14) is used to return the towed sensing apparatus 102 to the surface (e.g., above the body of water 10). In this manner, the towed sensing apparatus 102 can be lowered and raised (e.g., in a "yo-yo" movement) to collect vertical water column profiles 18.

In some aspects, the data collection can be automated. For example, the winch 20 can be an automated winch, which can tow the towed sensing apparatus 102. The sensing apparatus 102 can provide real time data feed (e.g., information collected by the sensor). The automated winch and an on-board depth sensor can be used to control the depth of travel (e.g., stopping the towed sensing apparatus 102 at a predetermined depth, before contacting the seafloor 16). For instance, the sensing apparatus 102 can include one or more on-board depth sensors for obtaining depth information associated with the currently deployed depth of the sensing apparatus 102. Based on determining that the currently deployed depth of the sensing apparatus 102 is greater than a pre-determined threshold (e.g., a maximum deployment depth that is less than the seafloor depth), the depth of travel of the towed sensing apparatus 102 can be stopped prior to the towed sensing apparatus 102 contacting the seafloor 16. In some embodiments, the one or more on-board depth sensors can include a pressure sensor (e.g., water pressure information from the pressure sensor can be used to determine the currently deployed depth of the towed sensing apparatus 102 and/or sensed pressure values can be compared to known pressure values associated with particular water depths, etc.).

In some aspects, the tow cable 14 is a heavy, double armored steel tow cable. In other words, the tow cable 14 is not a neutral weight-based Kevlar type tow cable. The heavy, double armored steel tow cable can increase the combined mass of the towed sensing apparatus 102 and the tow cable 14. Moreover, the heavy, double armored steel tow cable can improve the durability of the towed sensing apparatus 102. For example, when it is deployed (e.g., collecting a vertical water column profile 18), the towed sensing apparatus 102 is often near other towed equipment and/or fishing equipment, which can chaff and/or sever a Kevlar type tow cable.

Figure 2A:
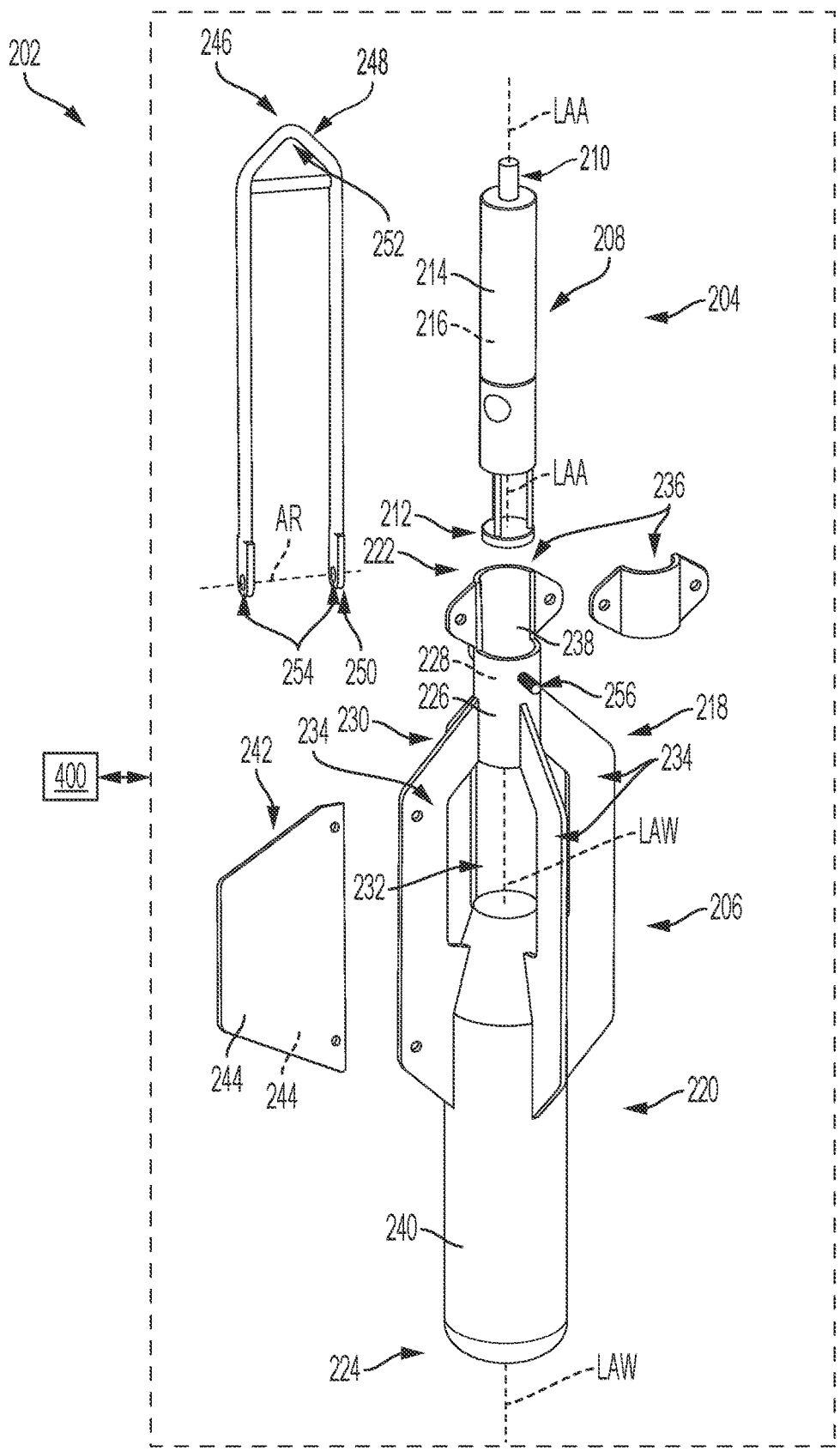
FIGS. 2A-2B illustrate an exploded perspective view and a perspective view, respectively, of a towed sensing apparatus, according to an exemplary embodiment.
Figure 2B:
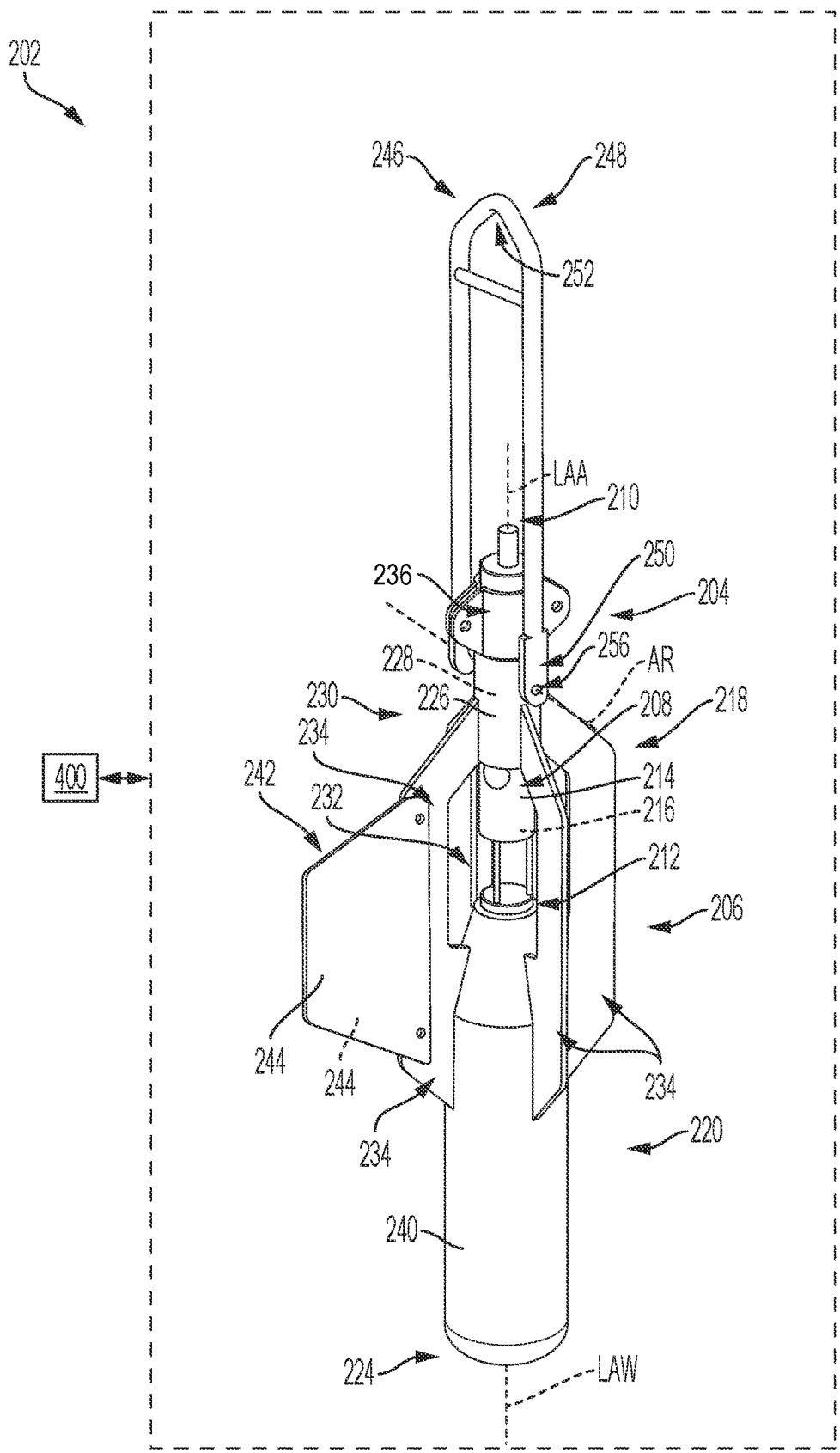

FIGS. 2A-2B illustrate an exemplary embodiment of a towed sensing apparatus 202 in an exploded perspective view and perspective view, respectively. The towed sensing apparatus 202 illustrated in FIGS. 2A-2B can be deployed to perform underwater profiling (e.g., collecting a vertical water column profile 18 as illustrated in FIG. 1) in a same or similar manner as the towed sensing apparatus 102 described with respect to FIG. 1. The towed sensing apparatus 202 includes a sensor array 204 and a drop weight 206, which can be removably coupled together. The towed sensing apparatus 202 is modular, such that it can be disassembled (as illustrated for example in FIG. 2A) or assembled (as illustrated for example in FIG. 2B).

The disclosure turns now to the sensor array 204, which is removably coupled to the drop weight 206 (e.g., received by the drop weight 206). In some examples, the drop weight 206 is received by a receptacle 230 of a sensor housing portion 218 of the drop weight 206. When the towed sensing apparatus 202 is deployed (e.g., collecting a vertical water column profile 18 as illustrated in FIG. 1), the sensor array 204 determines information pertaining to the vertical water column profile 18. For example, the sensor array 204 can include one or more sound velocity sensors that can collect sound velocity information for generating or otherwise determining a vertical water column profile (e.g., such as the vertical water column profile 18). The sensor array 204 has a mass (e.g., weight). In some aspects, the mass of the sensor array 204 is less than mass of the drop weight 206 (e.g., less than the mass of the weighted nose portion 218 of the drop weight 206).

The sensor array 204 includes a housing 208, which extends from a first end 210 to a second end 212 and defines a longitudinal axis LAA. The housing 208 defines an outer surface 214 and, in some examples, can define an inner surface 216. The inner surface 216 can define an interior volume of the of the housing 208, which can enclose one or more sensors, as discussed below. In some embodiments, the housing 208 is cylindrically shaped (e.g., the outer surface 214 is generally cylindrical), such that the housing 208 defines a cross-sectional diameter of the sensor array 204. In some aspects, the cross-sectional diameter of the sensor array 204 is less than a cross-sectional diameter of the drop weight 206 (e.g., cross-sectional diameter of the sensor housing portion 218, cross-sectional diameter of the weighted nose portion 218). In some examples, the housing 208 is a cylindrical shell which encloses the interior volume (e.g., interior volume defines an inner surface 216 of the cylindrical shell).

The sensor array 204 is removably coupled to (e.g., received by) the drop weight 206 of the towed sensing apparatus 202 (e.g., received by the sensor housing portion 218). In some embodiments, when the sensor array 204 is removably coupled to the drop weight 206, the longitudinal axis LAA of the sensor array 204 is parallel to a longitudinal axis LAW of the drop weight 206 (e.g., longitudinal axis of the sensor housing portion 218, longitudinal axis of the weighted nose portion 220). In some aspects, when the sensor array 204 is removably coupled to the drop weight 206, the longitudinal axis LAA of the sensor array 204 is coincident with a longitudinal axis LAW of the drop weight 206.

Because the sensor array 204 is removably coupled to the drop weight 206, the towed sensing apparatus 202 is modular (e.g., a given sensor array 204 can be compatible with various different drop weights 206 in an interchangeable manner, and vice versa). In other words, the sensor array 204 can be removed and replaced (e.g., swapped), via coupling mechanism 236, as discussed below. For example, the existing sensor array 204 can be removed (e.g., decoupled from the rigid affixation with the drop weight 206) when the sensor array 204 is at or near the end of its service life and replaced with an operational (e.g., newer) sensor array 204. In one example, when a sensor array 204 fails, the drop weight 206 can be removed from the inoperative sensor array 204. Then, the drop weight 206 can be removably coupled (e.g., receive) an operative (e.g., newer) sensor array 204.

In one illustrative example, when the sensor array 204 is removably coupled to the drop weight 206, the sensor array 204 is rigidly affixed (e.g., via coupling mechanism 236) to the drop weight 206, such that the sensor array 204 does not move (e.g., does not translate, does not rotate) relative to the drop weight 206 even when external forces are applied (e.g., as the towed sensing apparatus 202 is raised and lowered in the body of water while collecting a vertical water column profile 18 as illustrated in FIG. 1). When the sensor array 204 is rigidly affixed to the drop weight 206, the longitudinal axis LAA of the sensor array 204 is inhibited from moving (e.g., translating, rotating) with respect to the longitudinal axis LAW of the drop weight 206 even when external forces are applied.

The sensor array 204 includes one or more sensors (e.g., sound velocity sensor(s), depth sensor(s)). In some embodiments, the one or more sensors are positioned (e.g., enclosed) within the interior volume (e.g., inside the inner surface 216) of the housing 208, as previously discussed. In some examples, the one or more sensors are affixed to the inner surface 216 of the housing 208. The one or more sensors can include one or more sound velocity sensors, one or more depth sensors, or both (e.g., one or more sound velocity sensors and one or more depth sensors).

In examples, the one or more sensors (e.g., within the sensor array 204) include one or more sound velocity sensors. The sound velocity sensors are configured to determine vertical water column profile information when the towed sensing apparatus 202 is deployed (e.g., collecting a vertical water column profile 18 as illustrated in FIG. 1).

In some examples, the one or more sensors (e.g., within the sensor array 204) include one or more depth sensor(s). The depth sensors are configured to determine the dive depth of the towed sensing apparatus 202 when the towed sensing apparatus 202 is deployed (e.g., collecting a vertical water column profile 18 as illustrated in FIG. 1). In some aspects, the depth sensor is a pressure sensor configured to generate water pressure information that is indicative of (e.g., correlates to) the dive depth of the towed sensing apparatus 202. The water pressure information can correspond to a detected pressure of the water flow provided to the sensor array 204 (e.g., water flow through the one or more apertures 232 of the sensor housing portion 218). In other words, the pressor sensor can record data that can be used to calculate the current depth of the sensor (e.g., depth of the towed sensing apparatus 202).

In some aspects, the subsurface deployment of the towed sensing apparatus 202 is controlled based on the water pressure information such that each deployment cycle (of multiple deployment cycles) of the towed sensing apparatus is stopped based on the water pressure information being greater than a pre-determined threshold. In some aspects, the pre-determined threshold includes a pressure value associated with a pre-determined seafloor separation distance.

Figure 4:
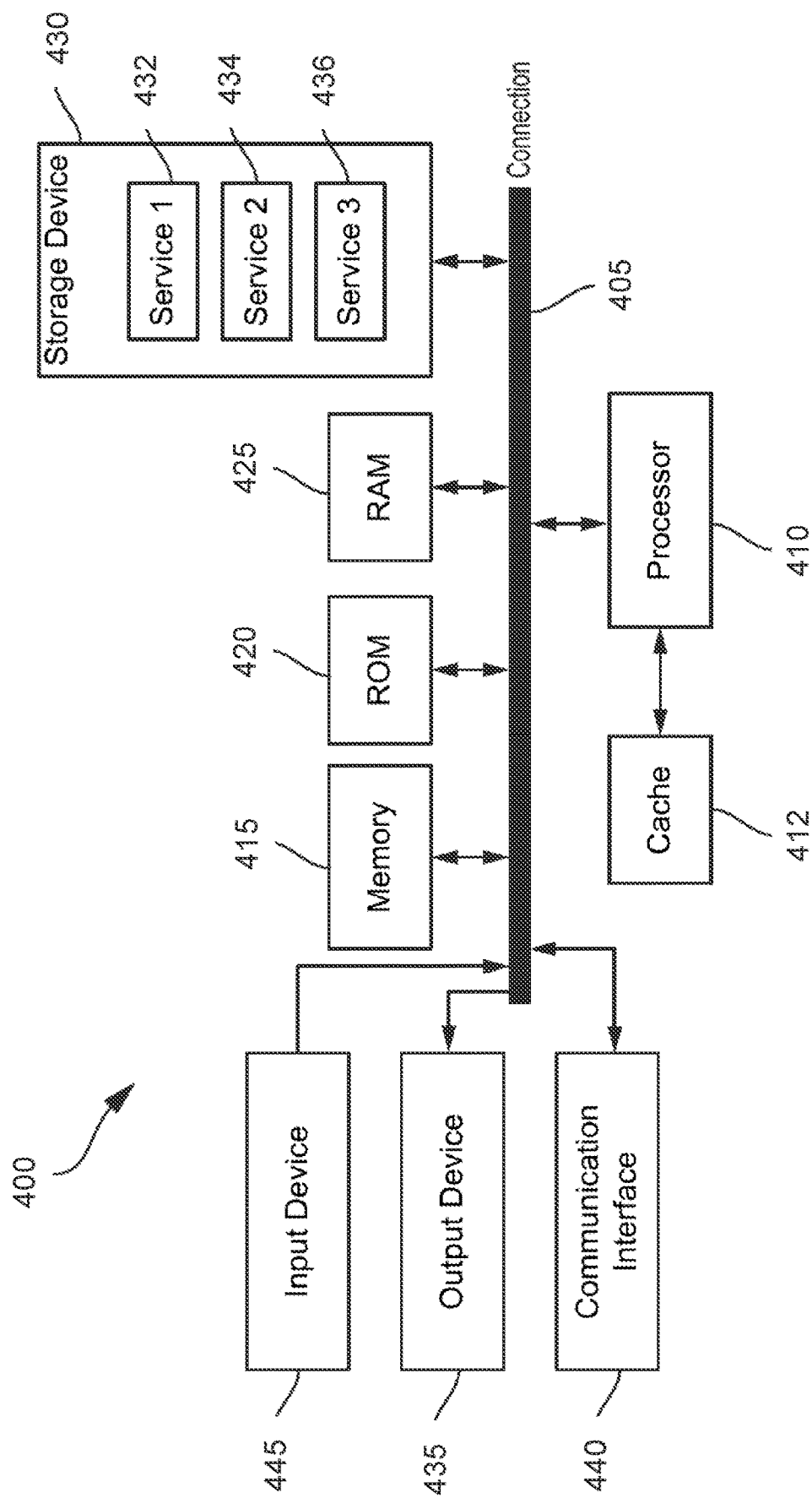
FIG. 4 is a block diagram illustrating an example of a computing system for implementing certain aspects described herein.

The sensor array 204 can be communicatively coupled to a computing system 400 (e.g., surface receiver), as illustrated in FIG. 4 and discussed in greater depth below, such that the sensor array 204 can send data to the computing system 400. In some aspects, a serial communication interface can be communicatively coupled between the sensor array 204 and the corresponding computing system 400. In this manner, the computing system 400 can receive information from the one or more sensors (e.g., sound velocity sensor(s), depth sensor(s)) of the sensor array 204.

The sensor array 204 can be electrically coupled to a surface power source (e.g., power supply). In some aspects, at least one power distribution interface (e.g., one or more power distribution interfaces) can be electrically coupled between the sensor array 204 and the surface power source. In this manner, the sensor array 204 can be electrically powered such that it can collect information (e.g., pertaining to the vertical water column profile 18 as illustrated in FIG. 1).

The disclosure turns now to the drop weight 206, which is removably coupled to the sensor array 204 (e.g., receives the sensor array 204). Then, when the towed sensing apparatus 202 is deployed (e.g., collecting a vertical water column profile 18 as illustrated in FIG. 1), the drop weight 206 promotes substantially vertical (e.g., downward) movement of the towed sensing apparatus 202. In some aspects, the drop weight 206 inhibits substantially horizontal movement and/or rotational movement of the towed sensing apparatus 202 when it is deployed. For example, the mass of the weighted nose portion 220 causes the towed sensing apparatus 202 to move through the water substantially vertically (e.g., downward), thereby inhibiting horizontal movement of the towed sensing apparatus 202.

The drop weight 206 includes a sensor housing portion 218 (e.g., receives the sensor array 204) and a weighted nose portion 220 (e.g., maintains the sensor array 204 in a relatively vertical position when the towed sensing apparatus 202 is deployed). The drop weight 206 extends from a first end 222 to a second end 224 and defines a longitudinal axis LAW.

Turning now to the sensor housing portion 218, the sensor housing portion 218 can receive the sensor array 204. In some aspects, the sensor housing portion 218 extends from the weighted nose portion 220 (e.g., along the longitudinal axis LAW of the drop weight 206) to the first end 222 of the drop weight 206. In some aspects, the sensor housing portion 218 is disposed at a first end of the weighted nose portion 220 (e.g., the first end of the weighted nose portion 220 is opposite the second end 224 of the drop weight 206).

The sensor housing portion 218 defines an outer surface 226 and an inner surface 228. The sensor housing portion 218 can define a cross-sectional diameter. The sensor housing portion 218 has a mass (e.g., weight). In some aspects, the mass of the sensor housing portion 218 is less than the mass of the weighted nose portion 220.

The sensor housing portion 218 defines a receptacle 230, which can receive the sensor array 204. For example, the sensor array 204 can be advanced into (e.g., slidably engaged with) the receptacle 230 (e.g., the receptacle 230 receives the sensor array 204). In some embodiments, the inner surface 228 of the sensor housing portion 218 defines a portion of the receptacle 230 such that the inner surface 228 abuts the outer surface 214 of the sensor array 204 when the receptacle 230 receives (e.g., via slidable engagement) the sensor array 204.

The receptacle 230 includes one or more apertures 232 (e.g., openings), which provide water flow (e.g., clean constant water flow, laminar flow) to the sensor array 204 when the towed sensing apparatus 202 is deployed. In some embodiments, more than one longitudinal support members 234 are disposed circumferentially about the longitudinal axis LAW of the drop weight 206 (e.g., longitudinal axis of the sensor housing portion 218). Thus, when the receptacle 230 receives the sensor array 204, the longitudinal support members 234 of the receptacle 230 are disposed circumferentially about the sensor array 204.

The longitudinal support members 234, as described previously, can rigidly affix the weighted nose portion 220 to the sensor housing portion 218. In some aspects, each aperture of the one or more apertures 232 is defined between adjacent pairs of the longitudinal support members 234. In some aspects, the longitudinal support members 234 can define a partially enclosed volume (e.g., of the receptacle 230), which receives a portion of the sensor array 204.

A coupling mechanism 236 can removably couple the sensor array 204 to the sensor housing portion 218 (e.g., removably coupling the sensor array 204 within the receptacle 230), thereby removably coupling the sensor array 204 to the drop weight 206. When the coupling mechanism 236 removably couples the sensor array 204 to the sensor housing portion 218, the sensor array 204 is rigidly affixed to the drop weight 206, such that the sensor array 204 does not move (e.g., does not translate, does not rotate) relative to the drop weight 206 even when external forces are applied (e.g., as the towed sensing apparatus 202 is raised and lowered in the body of water while collecting a vertical water column profile 18 as illustrated in FIG. 1). When the sensor array 204 is rigidly affixed to the drop weight 206, the longitudinal axis LAA of the sensor array 204 is inhibited from moving (e.g., translating, rotating) with respect to the longitudinal axis LAW of the drop weight 206 even when external forces are applied. In other words, the coupling mechanism 236 securely fixes the sensor array 204 in place. In some aspects, the coupling mechanism 236 is at a first end of the sensor housing portion 218 (e.g., the first end 222 of the drop weight 206).

In some aspects, the coupling mechanism 236 is a clamp (e.g., saddle clamp) configured to removably couple the sensor array 204 to the sensor housing portion 218. For example, inner surfaces 238 of the clamp can contact the outer surface 214 of the sensor array 204 when the clamp is closed (e.g., to removably couple the sensor array 204 to the sensor housing portion 218), such that the sensor array 204 is rigidly coupled to the sensor housing portion 218. In some aspects, the clamp is a saddle clamps that includes two saddles. Each saddle can define a semi-cylindrical inner surface (e.g., inner surface 238) and include two planar members extending outward therefrom (e.g., one planar member on each side of the semi-cylindrical surface of each saddle). The planar members can each include an aperture, such that the semi-cylindrical inner surfaces 238 of each saddle clamp are brought into clamped contact with the outer surface 214 of the sensor array 204 with the planar members of opposing saddles aligned. Then, a fastener (e.g., bolt) can be advanced through each set of aligned apertures of the abutting planar members to close the saddle clamp (e.g., removably couple the sensor array 204 to the sensor housing portion 218).

Turning now to the weighted nose portion 220, the weighted nose portion 220 can maintain the sensor array 204 in a relatively vertical position when the towed sensing apparatus 202 is deployed (e.g., majority of the mass is at the second end 224 of the drop weight 206). In some aspects, the weighted nose portion 220 extends from the sensor housing portion 218 (e.g., along the longitudinal axis LAW of the drop weight 206) to the second end 224 of the drop weight 206. In some aspects, the weighted nose portion 220 is disposed at a second end of the sensor housing portion 218 (e.g., the second end of the sensor housing portion 218 is opposite the first end 222 of the drop weight 206).

In some aspects, the weighted nose portion 220 is rigidly affixed to the sensor housing portion 218 (e.g., rigidly affixed to the coupling mechanism 236) by one or more of the longitudinal support members 234. As previously discussed, adjacent pairs of the longitudinal support members 234 can define an aperture 232 (e.g., each aperture 232 is between adjacent pairs of the longitudinal support members 234). Each aperture 232 can promote constant laminar water flow to the sensor array 204. In this manner, the sensor housing portion 218 (e.g., receptacle 230) can define an open volume, which can extend longitudinally between the coupling mechanism 236 and the weighted nose portion 220.

The weighted nose portion 220 defines an outer surface 240. The weighted nose portion 220 can be cylindrically shaped (e.g., the outer surface 240 is generally cylindrical), such that the weighted nose portion 220 defines a cross-sectional diameter. In some aspects, the cross-sectional diameter of the weighted nose portion 220 is greater than the cross-sectional diameter of the sensor array 204.

The weighted nose portion 220 has a mass (e.g., weight). In some aspects, the mass of the weighted nose portion 220 is greater than the mass of the sensor housing portion 218 and the sensor array 204 (e.g., combined mass of the sensor housing portion 218 and the sensor array 204). When the towed sensing apparatus 202 is deployed (e.g., collecting a vertical water column), the mass of the weighted nose portion 220 causes the towed sensing apparatus 202 to move through the water substantially vertically (e.g., downward), thereby inhibiting horizontal movement of the towed sensing apparatus 202.

The disclosure turns now to the hydrodynamic surface 242, which can be included in one or more hydrodynamic surfaces extending radially from the towed sensing apparatus 202. In some embodiments, the hydrodynamic surface 242 can be coupled (e.g., removably coupled) to the drop weight 206. Then, when the towed sensing apparatus 202 is deployed (e.g., collecting a vertical water column profile 18 as illustrated in FIG. 1), the hydrodynamic surface 242 can promote a substantially vertical (e.g., downward) movement of the towed sensing apparatus 202. For instance, one or more hydrodynamic surfaces can be configured as a depressor wing arranged to exert a downward driving force on the towed sensing apparatus 202 during a subsurface deployment of towed sensing apparatus. In some aspects, the one or more hydrodynamic surfaces can include one or more stabilizing fins (and/or other hydrodynamic surfaces) extending radially away from at least one of the sensor housing portion 218 and the weighted nose portion 220. For instance, each stabilizing fin of the one or more stabilizing fins can be arranged to exert a damping force based on a radial velocity of the towed sensing apparatus 202. In one illustrative example, each stabilizing fin can be arranged to exert a damping force to oppose rotation of the towed sensing apparatus 202 around a central longitudinal axis LAW of the towed sensing apparatus 202. For example, the hydrodynamic surface 242 can be provided as a stabilizing fin to inhibit rotation of the towed sensing apparatus 242. In such an example, the hydrodynamic surface 242 inhibits substantially horizontal movement and/or rotational movement of the towed sensing apparatus 202 when it is deployed. For example, the hydrodynamic surface 242 inhibits horizontal movement and/or rotation of the towed sensing apparatus 202, thereby causing the towed sensing apparatus 202 to move through the water substantially vertically (e.g., downward). In some instances, two or more hydrodynamic surface 242 can be coupled (e.g., removably coupled) to the drop weight 206. In some embodiments, the two or more hydrodynamic surfaces can be the same or similar to one another (e.g., two or more stabilizing fins). In some examples, the two or more hydrodynamic surfaces can include at least one stabilizing fin for inhibiting rotational movement of the towed sensing apparatus 202 about its longitudinal axis LAW and at least one depressor wing arranged to exert a downward driving force during subsurface deployment of the towed sensing apparatus 202.

As noted previously, in some aspects, as illustrated for example in FIGS. 2A-2B, the hydrodynamic surface 242 is a stabilizing fin. The stabilizing fin can be coupled (e.g., removably coupled) to the towed sensing apparatus 202 (e.g., coupled to a longitudinal support member 234). When coupled to the towed sensing apparatus 202, the stabilizing fin can extend radially outward from the towed sensing apparatus 202 (e.g., radially outward from the sensor housing portion 218, radially outward from the weighted nose portion 220). When the towed sensing apparatus 202 is deployed (e.g., collecting a vertical water column profile 18 as illustrated in FIG. 1), the stabilizing fin exerts a stabilizing force to oppose rotation of the towed sensing apparatus 202 (e.g., inhibit rotational movement) about the longitudinal axis of the towed sensing apparatus 202 (e.g., longitudinal axis LAA of the sensor array 204, longitudinal axis LAW of the drop weight 206). In other words, the stabilizing fin inhibits twisting of the tow cable 14 (e.g., tether) and helps to maintain to towed apparatus 202 moving forward as it move through the water column, In some examples, when the stabilizing fin is removably coupled to the towed sensing apparatus 202, two or more apertures through the stabilizing fin can be aligned with two or more apertures on the towed sensing apparatus 202 (e.g., two or more apertures through a longitudinal support member 234). Then, fasteners (e.g., bolts, screws) can be advanced therethrough to removably couple the stabilizing fin to the towed sensing apparatus 202.

The disclosure turns now to the pivoting coupler 246. The pivoting coupler 246 can couple the towed sensing apparatus 202 (e.g., the sensor housing portion 218) to the tow cable 14 (e.g., tether) (as illustrated in FIG. 1), thereby connecting the towed sensing apparatus 202 to the surface vessel 12 (as illustrated in FIG. 1).

The pivoting coupler 246 extends from a first end 248 to a second end 250. In some embodiments, the first end 248 can be coupled (e.g., removably coupled) to the tow cable 14 (e.g., tether) (as illustrated in FIG. 1). For example, attachment point 254 (e.g., v-shape at the first end 248) can receive and retain one end of the tow cable 14. The second end 250 can be coupled (e.g., removably coupled) to the towed sensing apparatus 202 (e.g., the sensor housing portion 218).

In some embodiments, the pivoting coupler 246 (e.g., pivoting hanger) can include one or more attachment points 254 (e.g., apertures), which can define an axis of rotation AR. In some aspects, the attachment points 254 are disposed at the second end 250 of the pivoting coupler 246. The attachment points 254 on the pivoting coupler 246 can be removably coupled (e.g., rotatably coupled) to attachment points 256 (e.g., bosses) on the towed sensing apparatus 202, such that that the pivoting coupler 246 can rotate about the axis of rotation AR (e.g., pivot point). The axis of rotation AR of the pivoting coupler can be substantially perpendicular to the longitudinal axis LAW of the drop weight 206. In some aspects, as the pivoting coupler 246 rotates about the axis of rotation AR, the axis of rotation AR of the pivoting coupler can remain substantially perpendicular to the longitudinal axis LAW of the drop weight 206.

In some aspects, the pivoting coupler 246 is disposed at the first end of the sensor housing portion 218 (e.g., disposed at the first end 222 of the drop weight 206). For example, the attachment points 256 of the towed sensing apparatus 202 can be on the sensor housing portion 218, such that the pivoting coupler 246 is removably coupled (e.g., rotationally coupled) to the sensor housing portion 218.

Figure 3A:
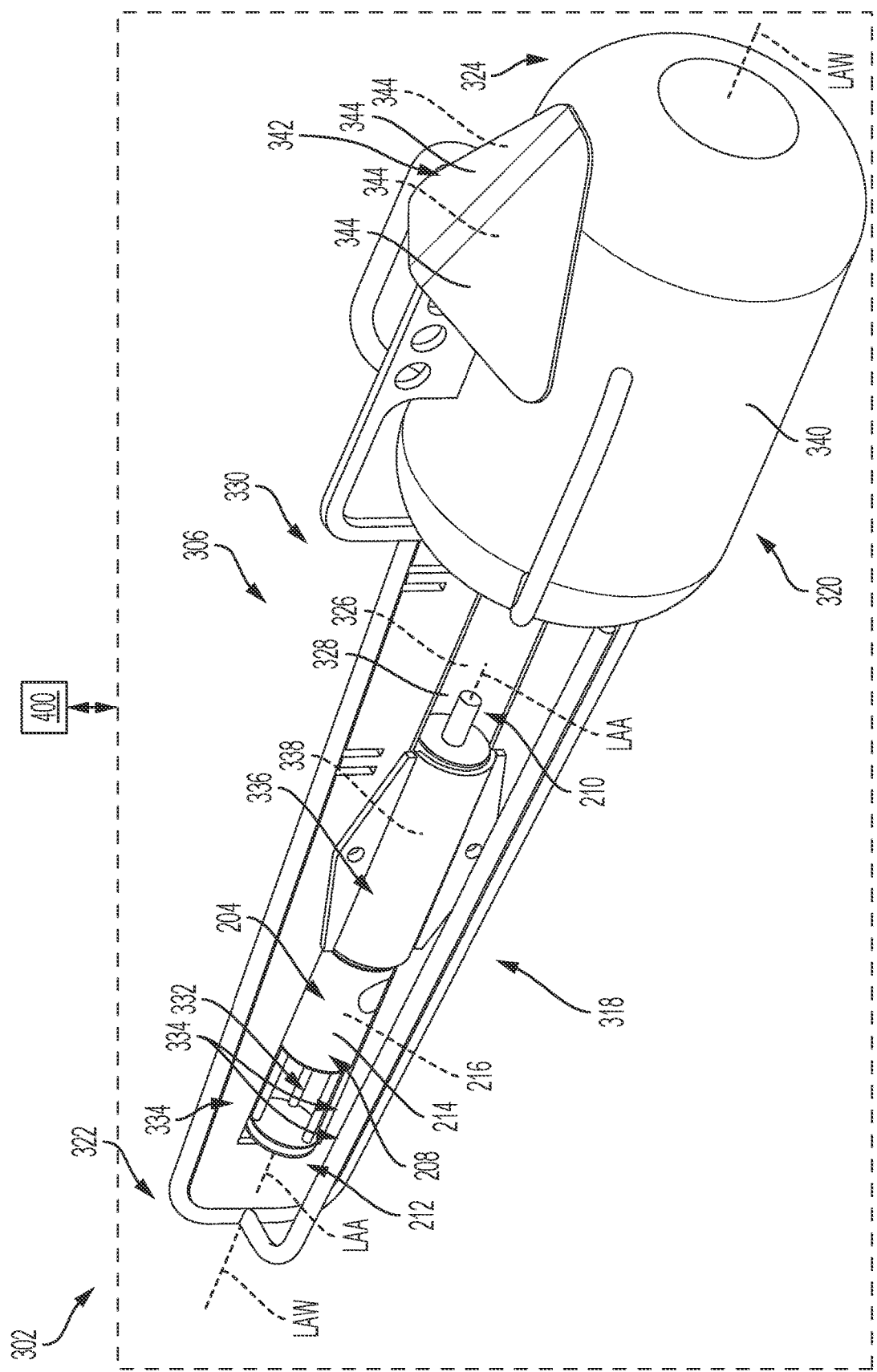
FIGS. 3A-3B illustrate a perspective view and a side view, respectively, of a towed sensing apparatus, according to an exemplary embodiment.
Figure 3B:
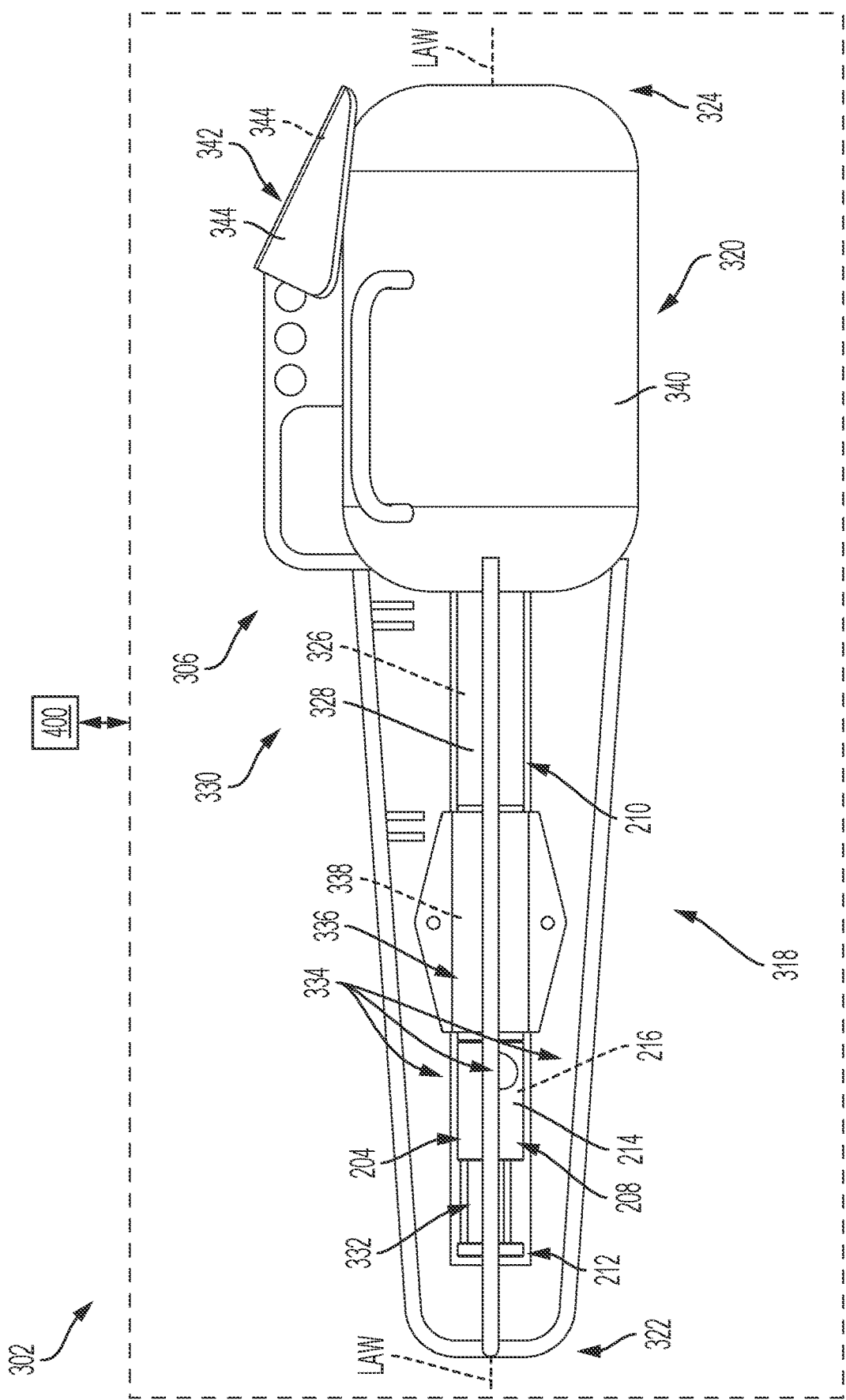

FIGS. 3A-3B illustrate another exemplary embodiment of a towed sensing apparatus, in accordance with one or more aspects of the present disclosure. For example, FIG. 3A depicts an example towed sensing apparatus 302 in a perspective view and FIG. 3B depicts the example towed sensing apparatus 302 in a side view. The towed sensing apparatus 302 illustrated in FIGS. 3A-3B can include one or more same or similar features as those described above with respect to the towed sensing apparatus 202 in FIGS. 2A-2B. Due to the same or similar features, the reference numbers and corresponding description provided above for various components, elements, portions, etc., included in the towed sensing apparatus 202 in FIGS. 2A-2B may be generally applied to the same or similar components, elements, portions, etc., included in the towed sensing apparatus 302 described in FIGS. 3A-3B; however, the reference numbers in FIGS. 3A-3B are 300 series rather than 200 series (e.g., The towed sensing apparatus 302 illustrated in FIGS. 3A-3B can be deployed to perform underwater profiling (e.g., collecting a vertical water column profile 18 as illustrated in FIG. 1) in the same manner as the towed sensing apparatus 102 described with respect to FIG. 1.

The towed sensing apparatus 302 includes a sensor array 204 and a drop weight 306, which can be removably coupled together. The sensor array 204 illustrated in FIGS. 3A-3B can be the same as the sensor array 204 illustrated in FIGS. 2A-2B, therefore, the same reference numbers (e.g., 200 series) as illustrated in FIGS. 2A-2B are repeated in FIGS. 3A-3B. As previously discussed, the sensor array 204 is modular (e.g., interchangeable). For example, a sensor array 204 can be removed from the towed sensing apparatus 202 (as illustrated in FIGS. 2A-2B) and installed in the towed sensing apparatus 302 (as illustrated in FIGS. 3A-3B), or vice-versa.

As illustrated in FIGS. 3A-3B, the sensor housing portion 318 can include a tapered protrusion extending longitudinally away from the weighted nose portion 320. For example, the tapered protrusion can taper from a maximum taper at the weighted nose portion 320 to a minimum taper (e.g., at the first end 322 of the drop weight 306). The sensor housing portion 318 can define a cross-sectional diameter. In some aspects, the cross-sectional diameter of the sensor housing portion 318 is less than a cross-sectional diameter of the weighted nose portion 320 (e.g., the cross-sectional diameter of the weighted nose portion 320 is greater than the cross-sectional diameter of the sensor housing portion 318).

In some aspects, the towed sensing apparatus 302 can include no moving parts. Based on towed sensing apparatus 302 not including any moving parts, the likelihood of damage to towed sensing apparatus 302 can be decreased. For instance, in the absence of moving parts, the likelihood of damage caused by the tow cable 14 can be decreased or eliminated. In one illustrative example, the towed sensing apparatus 302 may be associated with reduced drag during subsurface deployment of the towed sensing apparatus 302 (e.g., such as during a subsurface deployment of towed sensing apparatus 302 for collecting the vertical water column profile data 18 described above with respect to FIG. 1). For instance, the towed sensing apparatus 302 can include a hydrodynamic surface 342 configured as a depressor wing coupled to the weighted nose portion 320 and arranged to exert a downward driving force on the towed sensing apparatus 302 (e.g., during subsurface deployment of the towed sensing apparatus 302). In some aspects, the depressor wing 342 can be built-in or otherwise integrated with the towed sensing apparatus 302. In other example, the depressor wing 342 can be rigidly and removably coupled to the towed sensing apparatus 302. As will be described in greater depth below, a size of the depressor wing 342 (e.g., a size of the hydrodynamic surface(s) associated with or otherwise used to implement depressor wing 342) can be changed to adjust the downward driving force exerted on the towed sensing apparatus 302. For instance, the size of the depressor wing 342 can be increased to provide a more aggressive cycle time (e.g., a shorter cycle time) associated with using the towed sensing apparatus 302 to obtain a vertical water column profile. Additionally, or alternatively, the size of depressor wing 342 can be increased during high-speed surveying operations and/or in the presence of high water current conditions, etc.

In some embodiments, the towed sensing apparatus 302 can have a total weight of approximately 100 pounds, although it is noted that other weights (both larger and smaller) may also be utilized without departing from the scope of the present disclosure. In some aspects, the towed sensing apparatus 302 can have a mass distribution that concentrates a majority of the total mass of the towed sensing apparatus in the weighted nose portion 320 or otherwise toward (e.g., in the direction of) the weighted nose portion 320. For example, in some embodiments the towed sensing apparatus 302 can have a mass distribution of approximately 90:10 between the distal end of the towed sensing apparatus 302 towards the weighted nose portion 320 and the opposite distal end of the towed sensing apparatus 302 (e.g., away from the weighted nose portion 320). For instance, when the towed sensing apparatus 302 has a total mass of 100 lbs., the distal end towards weighted nose portion 320 can have a mass of approximately 90 lbs. and the opposite distal end away from weighted nose portion 320 can have a mass of approximately 10 lbs. Various other total masses and mass distributions may also be utilized without departing from the scope of the present disclosure, where the various mass distributions concentrate a majority of the total mass of towed sensing apparatus 302 in the lower half of the towed sensing apparatus (e.g., toward the end of the towed sensing apparatus 302 with weighted nose portion 320). In some embodiments, a heavier weighted nose portion 320 and/or a heavier towed sensing apparatus 302 can be utilized in deeper water conditions. For instance, the total mass of the towed sensing apparatus 302 can be increased beyond 100 lbs. in deeper water conditions, in rougher water conditions, etc.

In some embodiments, the towed sensing apparatus 302 can include one or more center of gravity adjustable tow points for optimizing towing characteristics. For instance, the towed sensing apparatus 302 can include one or more different tow points (e.g., provided as apertures on a coupler or other tow mechanism affixed to the weighted nose portion 320). As illustrated, the towed sensing apparatus 302 can include a coupler extending radially from the outer surface of weighted nose portion 320, wherein the coupler includes three different center of gravity adjustable tow points (e.g., the three apertures provided in line with one another on the coupler extending radially from weighted nose portion 320 and adjacent to the depressor wing 342). The different tow points can be used to optimize towing characteristics of the towed sensing apparatus 302 in the vertical plane. For instance, a particular tow point of the different tow points can be selected to optimize the towing characteristics of the towed sensing apparatus 302 in the vertical plane extending in the deployment or dive direction of the towed sensing apparatus 302 (e.g., extending from the water surface to the seafloor). In one illustrative example, a particular tow point of the different center of gravity adjustable tow points can be selected to optimize the towing characteristics of the towed sensing apparatus 302 such that the towed sensing apparatus 302 "flies flat" through the body of water in which it is deployed (e.g., thereby providing optimal drag performance along the vertical plane extending from the water surface to the seafloor).

As mentioned previously, in one illustrative example, the towed sensing apparatus 302 can include at least one hydrodynamic surface that is configured as a depressor wing arranged to exert a downward driving force on the towed sensing apparatus 302 during a subsurface deployment of the towed sensing apparatus. In some aspects, as illustrated for example in FIGS. 3A-3B, the hydrodynamic surface 342 is a depressor wing that can be coupled (e.g., removably coupled) to the towed sensing apparatus 302 (e.g., coupled to the weighted nose portion 320). When the towed sensing apparatus 302 is deployed (e.g., collecting a vertical water column profile 18 as illustrated in FIG. 1), the hydrodynamic surface 342 (e.g., depressor wing) can exert a downward driving force on the towed sensing apparatus 302 as the towed sensing apparatus 302 moves through the water. In some aspects, the downward driving force can include a horizontal force and/or a vertical force. For example, the horizontal force can drive the towed sensing apparatus 302 horizontally toward a surface vessel 12 (as illustrated in FIG. 1) tethered to the towed sensing apparatus 302. The vertical force can drive the towed sensing apparatus 302 vertically away from the surface vessel 12 (as illustrated in FIG. 1) tethered to the towed sensing apparatus 302.

In some examples, when the depressor wing 342 is removably coupled to the towed sensing apparatus 302, one or more apertures on a member extending from the depressor wing 342 can be aligned with one or more apertures on the towed sensing apparatus 302 (e.g., one or more apertures on a bracket extending from the weighted nose portion 320). Then, fasteners (e.g., bolts, screws) can be advanced therethrough to removably couple the depressor wing 342 to the towed sensing apparatus 302.

As illustrated in FIGS. 3A and 3B, the towed sensing apparatus 302 can include a receptacle 330 for receiving the sensor array 204. The receptacle 330 can be included in a tapered sensor housing portion that is coupled at a first end to the weighted nose portion 320 and extends longitudinally away from the weighted nose portion 320. In some embodiments, the tapered sensor housing portion can taper from a first (e.g., maximum) width at a first distal end coupled to the weighted nose portion 320 to a second (e.g., minimum) width at a second distal end longitudinally opposite from the first distal end and the coupling to the weighted nose portion 320. The tapered sensor housing portion can include a longitudinal channel configured to receive an outer surface of the sensor array 204 therein. For instance, when the sensor array 204 is provided with a generally cylindrical shape and/or is provided in a generally cylindrical housing, the longitudinal channel of the tapered sensor housing can be provided as a cylindrical channel defining a corresponding empty cylindrical volume for receiving the sensor array 204 therein. The longitudinal channel defining the empty cylindrical volume for receiving the sensor array 204 can be the same as the receptacle of the tapered sensor housing portion. A coupling mechanism can be provided to couple the sensor array 204 to an inner surface of the receptacle (e.g., to couple the sensor array 204 to an inner surface of the longitudinal channel defining the empty cylindrical volume). For instance, the coupling mechanism can be provided as a saddle clamp 336 configured to enclose an outer surface of the sensor array 204. The saddle clamp 336 can be removably affixed to one or more corresponding apertures (e.g., through-holes or attachment points) provided on the body of the tapered sensor housing portion (e.g., radially outside of the longitudinal channel defining the empty cylindrical volume). By affixing the saddle clamp 336 to the tapered sensor housing portion, an outer surface of the sensor array 204 can be secured (e.g., pressed or clamped) between an inner surface of the saddle clamp 336 and an inner surface of the longitudinal channel defining the empty cylindrical volume of the receptacle for receiving the sensor array 204 therein.

In some embodiments, the sensor array 204 can be coupled to the tapered sensor housing portion such that circular face provided at one or more (or both) distal ends of the sensor array 204 (e.g., the circular faces of the sensor array 204 at the longitudinal distal ends of the sensor array 204 aligned with the longitudinal axis LAW, wherein the circular faces are perpendicular to the longitudinal axis LAW) are not in contact with the sensor housing portion and/or any other surface of the towed sensing apparatus 302. For instance, the saddle clamp 336 can be positioned along the longitudinal length of the longitudinal channel defining the empty cylindrical volume for receiving the sensor array 204 such that, when affixed within the longitudinal channel defining the empty cylindrical volume, at least the upper face of the sensor array 204 does not contact the sensor housing portion (e.g., wherein the upper face of the sensor array 204 is the circular face provided at the distal end of the sensor array 204 opposite from the weighted nose portion 302, the circular face being perpendicular to the longitudinal axis LAW). In some embodiments, the longitudinal gap or separation between the circular face of the sensor array 204 provided at its upper distal end can be separated from contact with the sensor housing portion to minimize or eliminate vibrations that may otherwise be coupled from the sensor housing portion (and/or other portions of the towed sensing apparatus 302) and into the sensor array 204. For instance, the circular face of the sensor array 204 at its upper distal end can be a reflector plate configured to reflect acoustic waves generated by the sensor array 204 (and passing through water flowing through one or more apertures and into the empty volume provided at the top of the sensor array 204) back to a sounding plate also included in the sensor array 204 and longitudinally aligned below (e.g., nearer to the weighted nose portion 320) than the upper reflector plate. Additionally, as noted above with respect to FIGS. 2A and 2B, a longitudinal gap or separation can be provided between the circular face of the sensor array 204 provided at its lower distal end (e.g., opposite from the upper face of the sensor array 204, wherein the lower face is the circular face provided at the distal end of the sensor array 204 nearer to the weighted nose portion 302, the lower circular face being perpendicular to the longitudinal axis LAW). The longitudinal gap or separation between the lower circular face of sensor array 204 and the weighted nose portion 320 (e.g., the portion of the longitudinal channel defining the empty cylindrical volume for receiving the sensor array 204) can be associated with one or more apertures for providing laminar fluid flow to the sensor array 204, as was also described previously above.

In one illustrative example, the presently disclosed towed sensing apparatuses (e.g., one or more, or both, of the towed sensing apparatus 202 depicted in FIGS. 2A and 2B and/or the towed sensing apparatus 302 depicted in FIGS. 3A and 3B) can include one or more tracking modules for determining precise underwater location information of the towed sensing apparatus during a subsurface deployment. For instance, the towed sensing apparatus can include one or more underwater tracking beacons, which can include (but are not limited to) ultra-short baseline underwater tracking beacons. The one or more underwater tracking beacons included in or otherwise coupled to the presently disclosed towed sensing apparatus can be used to determine a precise location of the towed sensing apparatus underwater in cross and long-track. In some aspects, the underwater tracking beacon(s) can determine location information relative to a tow point used to couple a tow cable 14 to the towed sensing apparatus. FOr instance, the underwater tracking beacon(s) can determine location information of the towed sensing apparatus relative to one or more of the adjustable center of gravity tow points included on the towed sensing apparatus 302, as described above with respect to FIGS. 3A and 3B. Additionally, or alternatively, one or more underwater tracking beacons can be used to determine location information relative to a tow point provided on pivoting coupler 246 included on the towed sensing apparatus 202, as described above with respect to FIGS. 2A and 2B.

In some embodiments, an on-board multi-beam sensing system of the towed sensing apparatus (e.g., which may be included in the sensor array 204 of the towed sensing apparatus) can be used to look ahead of the towed sensing apparatus and off to the sides (e.g., orthogonal to the "ahead" direction) of the towed sensing apparatus. The multi-beam sensing information obtained using the on-board multi-beam sensing system can be used to predict one or more trajectories indicative of future movement (e.g., futre trajectory) of the towed sensing apparatus through the body of water in which the towed sensing apparatus is deployed. In another illustrative example, historical bathymetry information may additionally, or alternatively, be used to predict one or more trajectories associated with the future movement of the towed sensing apparatus through the body of water in which the towed sensing apparatus is deployed. In some embodiments, multi-beam sensing information obtained using the on-board multi-beam sensing system (e.g., included in sensor array 204) can be utilized in combination with historical bathymetry information to predict the one or more trajectories. In particular, the one or more predicted trajectories can be used to adjust deployment of a tether cable (e.g., tow cable 14 of FIG. 1) used to couple or tether the presently disclosed towed sensing apparatus to a surface tow vessel, as has been previously described above. For instance, the one or more predicted trajectories can be analyzed against bathymetry data (historical or otherwise) indicative of various obstacles and geohazards that are in or near a predicted trajectory of the towed sensing apparatus. The obstacles and geohazards can include, but are not limited to, one or more of rocks, large sand waves, shipwrecks, etc. Based on identifying a predicted trajectory of the towed sensing apparatus that would cause a collision with (or a near-pass in which a separation distance between the projected trajectory of the towed sensing apparatus and the obstacle/geohazard is less than one or more pre-determined thresholds), the deployment (e.g., unspooling) of the tow cable tethering the towed sensing apparatus to the surface vessel can be adjusted to prevent or otherwise avoid the identified collision or near-pass. For instance, the deployment or unspooling of the tow cable can be halted entirely (e.g., thereby bringing the towed sensing apparatus to a halt in the vertical direction prior to the occurrence of the identified collision or near-pass). IN another example, the deployment or unspooling of the tow cable can be slowed, thereby allowing the horizontal movement of the surface vessel (e.g., coupled to the towed sensing apparatus at the other end of the tow cable) to dominate and move the towed sensing apparatus away from the identified collision or near-pass in the horizontal direction. After the automatic adjustment in the deployment or unspooling of the tow cable has been performed, the systems and techniques described herein can be used to determine an updated trajectory projection for the towed sensing apparatus. If the updated trajectory projection(s) no longer cause a potential collision or near-miss with the same geohazard (and/or any additional geohazards) to be identified, the deployment or unspooling of the tow cable can be resumed.

FIG. 4 illustrates a computing system architecture, according to some embodiments of the present disclosure. Components of computing system architecture 400 are in electrical communication with each other using a connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random-access memory (RAM) 425 to processor 410. Computing system 400 can include a cache of high-speed memory 412 connected directly with, in close proximity to, or integrated as part of processor 410.

Processor 410 can include any general-purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A towed sensing apparatus for underwater profiling, comprising:
    a sensor array, the sensor array including one or more sound velocity sensors for determining vertical water column profile information and one or more depth sensors for determining one or more depths of the towed sensing apparatus;
    a sensor housing portion including a receptacle for receiving the sensor array, wherein the receptacle includes one or more apertures for providing water flow to the sensor array during a subsurface deployment of the towed sensing apparatus;
    a coupling mechanism for removably coupling the sensor array within the receptacle, wherein the coupling mechanism couples the sensor array to an inner surface of the receptacle;
    a weighted nose portion coupled to the sensor housing portion, wherein a first end of the towed sensing apparatus that includes at least the weighted nose portion has a greater mass than a second end of the towed sensing apparatus opposite from the first end, wherein the weighted nose portion is configured to cause the towed sensing apparatus to be lowered, substantially vertically, through a body of water; and
    one or more of hydrodynamic surfaces extending radially from the towed sensing apparatus, each hydrodynamic surface of the one or more hydrodynamic surfaces arranged to exert a respective force during subsurface deployment of the towed sensing apparatus,
    wherein the towed sensing apparatus is configured to collect the vertical water column profile information in a plurality of cycles, each cycle including:
        the towed sensing apparatus is lowered, substantially vertically, through a water column downwards towards a floor of the body of water, and
        in response to the one or more depths of the towed sensing apparatus being at a threshold depth, the towed sensing apparatus is pulled back to a surface of the body of water by a winch attached to a vessel towing the towed sensing apparatus.

2. The towed sensing apparatus of claim 1, wherein the coupling mechanism comprises a saddle clamp, and wherein the sensor array is rigidly coupled within the receptacle of the sensor housing portion based on an outer surface of the sensor array being clamped between an inner surface of the saddle clamp and the inner surface of the receptacle.

3. The towed sensing apparatus of claim 1, wherein the receptacle comprises an empty cylindrical volume for receiving the sensor array, wherein an inner diameter of the empty cylindrical volume of the receptacle is greater than or equal to an outer diameter of the sensor array.

4. The towed sensing apparatus of claim 3, wherein the coupling mechanism couples the sensor array within the empty cylindrical volume of the receptacle such that at least a first distal end of the sensor array does not contact the sensor housing portion.

5. The towed sensing apparatus of claim 1, wherein the receptacle includes a plurality of apertures for providing water flow to the sensor array, and wherein each respective aperture of the plurality of apertures is defined between adjacent pairs of longitudinal support members included in a plurality of longitudinal support members coupled to the weighted nose portion and disposed circumferentially about the sensor array.

6. The towed sensing apparatus of claim 1, wherein:
the one or more hydrodynamic surfaces include one or more stabilizing fins, each stabilizing fin extending radially away from at least one of the sensor housing portion and the weighted nose portion and arranged to exert a damping force based on a radial velocity of the towed sensing apparatus.

7. The towed sensing apparatus of claim 6, wherein:
each stabilizing fin is arranged to exert the damping force to oppose rotation of the towed sensing apparatus around a central longitudinal axis extending between the weighted nose portion and the sensor array.

8. The towed sensing apparatus of claim 1, wherein:
the one or more hydrodynamic surfaces include a depressor wing coupled to the weighted nose portion, wherein the depressor wing is arranged to exert a downward driving force on the towed sensing apparatus.

9. The towed sensing apparatus of claim 8, wherein, during subsurface deployment of the towed sensing apparatus, the downward driving force exerted by the depressor wing comprises:
a horizontal force that drives the towed sensing apparatus horizontally toward a surface vessel tethered to the towed sensing apparatus; and
a vertical force that drives the towed sensing apparatus vertically away from the surface vessel tethered to the towed sensing apparatus.

10. The towed sensing apparatus of claim 1, wherein the sensor array further includes a depth sensor for determining a dive depth of the towed sensing apparatus during subsurface deployment of the towed sensing apparatus.

11. The towed sensing apparatus of claim 10, wherein:
the depth sensor comprises a pressure sensor configured to generate water pressure information indicative of the dive depth of the towed sensing apparatus; and
the water pressure information corresponds to a detected pressure of the water flow provided to the sensor array through the one or more apertures included in the receptacle of the sensor housing portion.

12. The towed sensing apparatus of claim 11, wherein the subsurface deployment of the towed sensing apparatus is controlled based on the water pressure information such that each deployment cycle of a plurality of deployment cycles of the towed sensing apparatus is stopped based on the water pressure information being greater than a pre-determined threshold.

13. The towed sensing apparatus of claim 12, wherein the pre-determined threshold comprises a pressure value associated with a pre-determined seafloor separation distance.

14. The towed sensing apparatus of claim 1, further including:
a coupler affixed to an outer surface of the weighted nose portion, wherein the coupler includes one or more attachment points for coupling the towed sensing apparatus to a tow cable.

15. The towed sensing apparatus of claim 14, wherein the coupler is rigidly affixed to the outer surface of the weighted nose portion, and wherein the coupler includes a plurality of attachment points, each attachment point of the plurality of attachment points associated with a different center of gravity.

16. The towed sensing apparatus of claim 1, further including:
a serial communication interface communicatively coupled between the sensor array and a corresponding surface receiver; and
one or more power distribution interfaces electrically coupled between the sensor array and a surface power source.

17. The towed sensing apparatus of claim 1, wherein the sensor array comprises:
a cylindrical shell enclosing an interior volume; and
a plurality of sensors disposed within the interior volume of the cylindrical shell; wherein a longitudinal axis of the cylindrical shell is parallel to a longitudinal axis of the sensor housing portion and the weighted nose portion.

18. The towed sensing apparatus of claim 1, wherein:
the weighted nose portion comprises a cylindrical body having a cross-sectional diameter greater than a cross-sectional diameter of the sensor array and greater than a cross-sectional diameter of the sensor housing portion.

19. The towed sensing apparatus of claim 18, wherein:
the sensor housing portion comprises a tapered protrusion extending longitudinally away from the weighted nose portion; and
the tapered protrusion tapers from a maximum taper diameter at the weighted nose portion to a minimum taper diameter at the coupling mechanism.

20. A method of underwater profiling using a towed sensing apparatus, the method comprising:
deploying a towed sensing apparatus in a body of water, wherein the towed sensing apparatus is communicatively coupled to a surface vessel by a tether;
towing the towed sensing apparatus through the body of water using the surface vessel, wherein one or more hydrodynamic surfaces extending from the towed sensing apparatus convert a horizontal tow force exerted on the towed sensing apparatus by the surface vessel into a vertical downward driving force exerted on the towed sensing apparatus, wherein the towed sensing apparatus is configured to collect vertical water column profile information in a plurality of cycles, each cycle including:
automatically unspooling the tether, based on a currently determined dive depth of the towed sensing apparatus, to increase a deployed length of the tether coupling the towed sensing apparatus to the surface vessel;
obtaining a plurality of sound velocity measurements using a sound velocity sensor included in a sensor array of a sensor housing portion of the towed sensing apparatus, each sound velocity measurement of the plurality of sound velocity measurements associated with a different dive depth of the towed sensing apparatus and obtained during automatically unspooling the tether, wherein the sensor housing portion including a receptacle for receiving the sensor array, wherein the receptacle includes one or more apertures for providing water flow to the sensor array during a subsurface deployment of the towed sensing apparatus, wherein during the unspooling towed sensing apparatus is lowered, substantially vertically, through a water column downwards towards a seafloor of the body of water;

determining a plurality of depth measurements from one or more depth sensors for determining one or more depths of the towed sensing apparatus;

automatically stopping unspooling the tether based on comparing the currently determined dive depth of the towed sensing apparatus to a pre-determined threshold, wherein automatically stopping unspooling the tether is associated with a maximum deployed length of the tether that is configured to prevent contact between the towed sensing apparatus and the seafloor.

* * * * *